(12) United States Patent
Perko (10) Patent No.: US 12,287,942 B2
(45) Date of Patent: Apr. 29, 2025

(54) TOUCH-INTERFACE ARRANGEMENT

(71) Applicant: Aito BV, Amsterdam (NL)

(72) Inventor: Panu Perko, Espoo (FI)

(73) Assignee: AITO BV, Amsterdam (NL)

( * ) Notice: Subject to any disclaimer, the term of this patent is extended or adjusted under 35 U.S.C. 154(b) by 0 days.

(21) Appl. No.: 18/408,990

(22) Filed: Jan. 10, 2024

(65) Prior Publication Data

US 2024/0256091 A1 Aug. 1, 2024

(30) Foreign Application Priority Data

Jan. 26, 2023 (EP) .................................... 23153404

(51) Int. Cl.
*G06F 3/044* (2006.01)
*G06F 1/16* (2006.01)

(52) U.S. Cl.
CPC .......... *G06F 3/0443* (2019.05); *G06F 1/1692* (2013.01)

(58) Field of Classification Search
None
See application file for complete search history.

(56) References Cited

U.S. PATENT DOCUMENTS

| | | | | |
|---|---|---|---|---|
| 7,353,711 B2* | 4/2008 | O'Dowd | ............. | G01L 19/0076 73/753 |
| 7,829,812 B2* | 11/2010 | Tolbert | ................. | H01H 13/702 200/600 |
| 8,674,941 B2* | 3/2014 | Casparian | ............. | H01H 13/85 345/156 |
| 8,760,273 B2* | 6/2014 | Casparian | ............. | H01H 13/702 200/521 |
| 9,342,149 B2* | 5/2016 | Casparian | ............... | G06F 3/016 |
| 9,448,631 B2* | 9/2016 | Winter | ................ | G06F 3/03547 |
| 9,547,367 B2* | 1/2017 | Giraud | .................. | G06F 3/0412 |
| 9,819,343 B2* | 11/2017 | Koehne | ................ | G06F 3/0443 |
| 9,916,007 B2* | 3/2018 | Behles | .................... | G06F 3/041 |
| 11,079,849 B1* | 8/2021 | Knoppert | .............. | G06F 3/0219 |
| 11,119,598 B2* | 9/2021 | Laitinen | ................. | G06F 3/016 |
| 11,388,831 B2* | 7/2022 | Hoven | ................ | H05K 7/1427 |
| 11,954,255 B2* | 4/2024 | Lonnberg | ............... | G06F 3/016 |

(Continued)

FOREIGN PATENT DOCUMENTS

WO 2021144345 A1 7/2021

OTHER PUBLICATIONS

Extended European search report mailed Jun. 29, 2023 for corresponding patent application No. EP23153404.1 (11 pages).

*Primary Examiner* — Fred Tzeng
(74) *Attorney, Agent, or Firm* — The Small Patent Law Group LLC; Christopher R. Carroll (57) ABSTRACT

According to an embodiment, a touch-interface arrangement comprises an overlay layer; a capacitive sensor printed circuit board assembly, PCBA, mounted to the overlay layer, wherein the overlay layer is positioned on a first side of the capacitive sensor PCBA; at least one piezoelectric actuator positioned on a second side of the capacitive sensor PCBA, opposing the first side of the capacitive sensor PCBA, wherein the at least one piezoelectric actuator comprises a support plate and a piezoelectric ceramic; and at least one seal element positioned on the second side of the capacitive sensor PCBA for at least partially sealing the at least one piezoelectric actuator between the capacitive sensor PCBA and a support surface.

15 Claims, 6 Drawing Sheets

(56) References Cited

U.S. PATENT DOCUMENTS

| | | | |
|---|---|---|---|
| 2009/0027356 A1* | 1/2009 | Heimann | H03K 17/962 |
| | | | 345/174 |
| 2013/0250491 A1 | 9/2013 | Alakontiola et al. | |
| 2013/0250500 A1* | 9/2013 | Tossavainen | H04R 17/00 |
| | | | 361/679.01 |
| 2015/0070305 A1* | 3/2015 | Seo | G09G 3/36 |
| | | | 345/174 |
| 2015/0373441 A1 | 12/2015 | Behles et al. | |
| 2017/0052624 A1* | 2/2017 | Hunt | G06F 3/045 |
| 2021/0240282 A1* | 8/2021 | Gajiwala | G06F 3/016 |
| 2021/0294104 A1* | 9/2021 | Hossain | G02B 27/0093 |
| 2021/0325973 A1* | 10/2021 | Knoppert | G06F 1/1616 |
| 2022/0236810 A1* | 7/2022 | Gajiwala | H01H 13/7065 |
| 2022/0283639 A1* | 9/2022 | Ben Dhiab | G06F 3/0445 |
| 2023/0126612 A1* | 4/2023 | Gajiwala | G06F 3/03547 |
| | | | 340/407.2 |
| 2023/0359277 A1* | 11/2023 | Perko | H10N 30/88 |
| 2023/0376117 A1* | 11/2023 | Perko | G06F 1/169 |
| 2023/0384599 A1* | 11/2023 | Hossain | G06V 40/172 |
| 2023/0400924 A1* | 12/2023 | Gaillard | G06F 3/016 |

\* cited by examiner

TOUCH-INTERFACE ARRANGEMENT

CROSS-REFERENCE TO RELATED APPLICATIONS

This application claims priority to European Patent Application No. 23153404.1 (filed 26 Jan. 2023), the entirety of which is incorporated herein by reference.

BACKGROUND

Technical Field

The present disclosure relates to a touch-interface arrangement, and more particularly to a touch-interface arrangement for sensing and/or for providing a haptic effect.

Discussion of Art

Haptic effects, provided by for example haptic effect elements, such as piezoelectric actuators, can be utilized in providing a tactile sensation to a user in various applications. For example, in a touch-based user interfaces, such as in a laptop trackpad, a clicking sensation may be provided to a user without the touched surface moving significantly.

BRIEF DESCRIPTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a touch-interface arrangement. The foregoing and other objects are achieved by the features of the independent claims. Further implementation forms are apparent from the dependent claims, the description and the figures.

According to a first aspect, a touch-interface arrangement comprises: an overlay layer; a capacitive sensor printed circuit board assembly, PCBA, mounted to the overlay layer, wherein the overlay layer is positioned on a first side of the capacitive sensor PCBA; at least one piezoelectric actuator positioned on a second side of the capacitive sensor PCBA, opposing the first side of the capacitive sensor PCBA, wherein the at least one piezoelectric actuator comprises a support plate and a piezoelectric ceramic; and at least one seal element positioned on the second side of the capacitive sensor PCBA for at least partially sealing the at least one piezoelectric actuator between the capacitive sensor PCBA and a support surface. The touch-interface arrangement can, for example, have a reduced non-active area.

In an implementation form of the first aspect, the capacitive sensor PCBA is positioned on a first side of the support plate, the piezoelectric ceramic is positioned on a second side of the support plate, opposing the first side of the support plate, and the capacitive sensor PCBA comprises at least one recess for the at least one piezoelectric actuator for enabling haptic movement of the at least one piezo actuator. The touch-interface arrangement can, for example, have a reduced thickness.

In a further implementation form of the first aspect, a depth of the at least one recess is 0.03-1 millimeters. The touch-interface arrangement can, for example, allow sufficient movement of the at least one piezoelectric actuator while preventing overbending.

In a further implementation form of the first aspect, a thickness of the capacitive sensor PCBA is greater than the depth of the at least one recess. The touch-interface arrangement can, for example, allow sufficient movement of the at least one piezoelectric actuator while preventing overbending.

In a further implementation form of the first aspect, the capacitive sensor PCBA further comprises circuitry for controlling the at least one piezoelectric actuator. The touch-interface arrangement can, for example, have a reduced thickness due to integrating the circuitry for controlling the at least one piezoelectric actuator into the capacitive sensor PCBA.

In a further implementation form of the first aspect, the support surface comprises a C-cover of a laptop computer and the at least one seal element is positioned between the capacitive sensor PCBA and the C-cover. The touch-interface arrangement can, for example, be efficiently integrate into a laptop computer.

In a further implementation form of the first aspect, the at least one seal element is mounted to the C-cover and/or to the capacitive sensor PCBA with an adhesive. The touch-interface arrangement can, for example, be efficiently integrate and adhered into a laptop computer.

In a further implementation form of the first aspect, the touch-interface arrangement further comprises at least one flexible printed circuit, FPC, wherein the at least one piezoelectric actuator is electrically coupled to the at least one FPC. The touch-interface arrangement can, for example, have a reduced thickness while allowing control of the at least one piezoelectric actuator.

In a further implementation form of the first aspect, the at least one FPC is mounted to the capacitive sensor PCBA using two-sided adhesive tape, such as pressure-sensitive adhesives. The touch-interface arrangement can, for example, The touch-interface arrangement can, for example, have a reduced thickness while having a robust construction.

In a further implementation form of the first aspect, the overlay layer is mounted to the support surface via the at least one seal element. The touch-interface arrangement can, for example, efficiently shield the components inside the touch-interface arrangement against impurities and liquid.

In a further implementation form of the first aspect, the overlay layer is mounted to the support surface only via the at least one seal element and the at least one piezoelectric actuator. The touch-interface arrangement can, for example, allow movement of the overlay layer in the thickness direction.

In a further implementation form of the first aspect, the at least one seal element comprises polyurethane, microcellular urethane, microcellular urethane foam open cell urethane foam, closed cell urethane foam, silicone rubber, liquid silicone rubber, synthetic fibre fabric, and/or natural fibre fabric. The touch-interface arrangement can, for example, provide improved sealing of the components inside the touch-interface arrangement.

In a further implementation form of the first aspect, a compression load deflection of the at least one seal element is 0.5-50 kilopascal when measured according to JIS K 6254. Materials with such material parameters can, for example, provide improved sealing properties while not impairing the haptic effect provided by the device.

In a further implementation form of the first aspect, the overlay layer comprises a touch interface surface of a laptop computer.

It is to be understood that the implementation forms of the first aspect described above may be used in combination with each other. Several of the implementation forms may be combined together to form a further implementation form.

According to a second aspect, a laptop computer comprises the touch-interface arrangement according to the first aspect.

Many of the attendant features will be more readily appreciated as they become better understood by reference to the following detailed description considered in connection with the accompanying drawings.

BRIEF DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
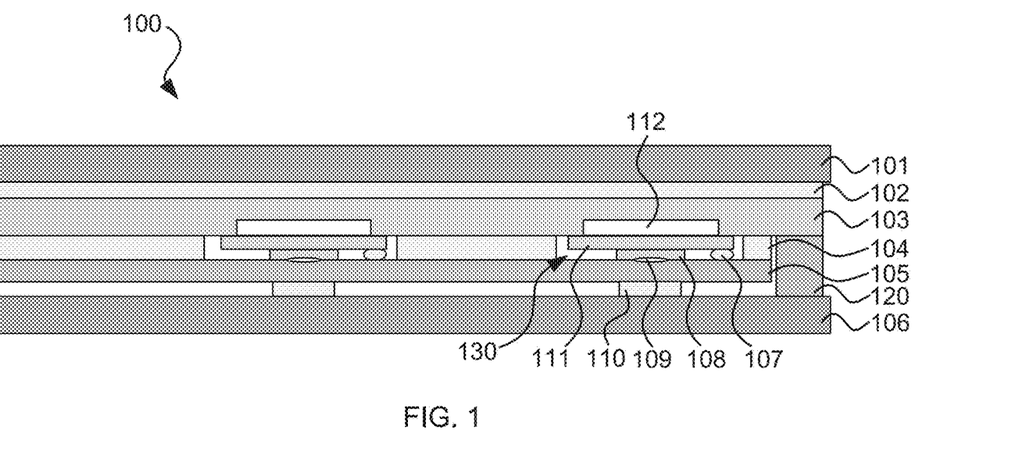
FIG. 1 illustrates cross-sectional representation of a touch-interface arrangement according to an embodiment.

FIG. 1 illustrates cross-sectional representation of a touch-interface arrangement 100 according to an embodiment.

The touch-interface arrangement 100 may also be referred to as a touch-interface arrangement for providing haptic effect, a touch-interface arrangement for providing haptic feedback, a touch-interface arrangement for sensing and/or for providing a haptic effect, or similar.

It should be appreciated that only a part of the touch-interface arrangement 100 is illustrated in some embodiments disclosed herein and these embodiments are only intended to illustrate some functionality of the touch-interface arrangement 100. For example, in the embodiment of FIG. 1 only a part of the touch-interface arrangement 100 is illustrated.

According to an embodiment, a touch-interface arrangement 100 comprises an overlay layer 101.

The overlay layer 101 may also be referred to as an overlay glass or similar.

The overlay layer 101 may be at least partially unobstructed on at least one side of the overlay layer 101. A user may touch the unobstructed part of the overlay layer 101 and the touch-interface arrangement 100 may detect the touches and/or provide haptic effect/feedback for the user via the overlay layer 101.

Herein, a layer may refer to a structure having its lateral dimensions substantially larger than its thickness. In that sense, a layer may be considered as being a thin structure. However, a layer does not need to have a uniform thickness. For example, in some embodiments disclosed herein, the thickness of a layer may vary between different sections of the layer.

The touch-interface arrangement 100 may further comprise a capacitive sensor printed circuit board assembly (PCBA) 103 mounted to the overlay layer 101, wherein the overlay layer 101 is positioned on a first side of the capacitive sensor PCBA 103.

For example, in the embodiment of FIG. 1, the capacitive sensor PCBA 103 is mounted to the overlay layer 101 using an adhesive layer 102. Other ways of mounting are also possible.

The capacitive sensor PCBA 103 may also be referred to as a capacitive sensor layer, a capacitive sensor printed circuit board (PCB), or similar.

The capacitive sensor PCBA 103 may be configured to detect touch on the overlay layer 101. The capacitive sensor PCBA 103 may comprise, for example, capacitive sensors for detecting touch on the overlay layer 101 and/or electronic circuitry for controlling such capacitive sensors.

In some embodiments, the capacitive sensor PCBA 103 can substantially extend to an outer edge of the overlay layer 101. This may apply to all edges of the capacitive sensor PCBA 103 and the overlay layer 101.

It can be desirable that the capacitive sensor PCBA 103 is not visible under the overlay layer 101 in a typical usage scenario when the touch-interface arrangement 100 is viewed from the side of the overlay layer 101, taking into account the used assembly tolerances. Thus, in some embodiments, a distance between an outer edge of the capacitive sensor PCBA 103 and an outer edge of the overlay layer 101 may be 0.1-2 millimetres (mm). This may apply to all edges of the capacitive sensor PCBA 103 and the overlay layer 101.

The touch-interface arrangement 100 may further comprise at least one piezoelectric actuator 130 positioned on a second side of the capacitive sensor PCBA 103, opposing the first side of the capacitive sensor PCBA 103, wherein the at least one piezoelectric actuator 130 comprises a support plate 111 and a piezoelectric ceramic 108.

The at least one piezoelectric actuator 130 may also be referred to as a piezoelectric sensor, a piezo sensor, a piezoelectric element, a haptic feedback element, a tactile feedback element, a piezo actuator, a piezoelectric transducer, a piezo transducer, or similar.

The support plate 111 may comprise, for example, a brass plate or similar.

The piezoelectric ceramic 108 may comprise piezoelectric material. When a voltage is applied over the piezoelectric ceramic 108, a strain may be induced into the piezoelectric ceramic 108. Thus, by applying a voltage over the piezoelectric ceramic 108, a haptic effect can be produced.

Although the at least one piezoelectric actuator 130 may be configured to provide a haptic effect when a voltage is applied over the piezoelectric ceramic 108, the at least one piezoelectric actuator 130 may also be used to detect touch on, for example, the overlay layer 101. When a force is applied to the overlay layer 101, a stress can be induced into the at least one piezoelectric actuator 130, and the stress can induce a voltage over the piezoelectric ceramic 108. This voltage may be detected. Moreover, if the at least one piezoelectric actuator 130 comprises a plurality of piezoelectric actuators, the location of the force can be determined.

In the embodiment of FIG. 1, the first side of the capacitive sensor PCBA 103 corresponds to the top side of the capacitive sensor PCBA 103 and the second side of the capacitive sensor PCBA 103 corresponds to the bottom side of the capacitive sensor PCBA 103.

The touch-interface arrangement 100 may further comprise at least one seal element 120 positioned on the second side of the capacitive sensor PCBA 103 for at least partially sealing the at least one piezoelectric actuator 130 between the capacitive sensor PCBA 103 and a support surface 106.

The at least one seal element 120 may also be referred to as a seal, a sealing element, or similar.

The at least one seal element 120 may be positioned on one side, on two side, on three side, or on four sides of the at least one piezoelectric transducer. For example, the at least one seal element 120 may be positioned on all edges of the capacitive sensor PCBA 103. The at least one seal element 120 may comprise any number of seal elements. For example, the at least one seal element 120 may comprise one seal element that follows the edges of the capacitive sensor PCBA 103 or there may be four separate seal elements, each positioned to a corresponding edge of the capacitive sensor PCBA 103.

The support surface 106 may also be referred to as a bottom layer, a bottom structure, a bracket, a back plate, a carrier, or similar.

The support surface 106 may be part of the touch-interface arrangement 100 or the support surface 106 may be part of some other device, such as a device into which the touch-interface arrangement 100 is integrated.

The cross-sectional geometry and/or dimensions presented in the embodiments disclosed herein are only exemplary and may not reflect actual geometry and/or dimensions of the parts/layers/components presented.

The at least one seal element 120 can be placed between the capacitive sensor PCBA 103 and the support surface 106. The at least one seal element 120 can be mounted to the support surface 106 and/or to the capacitive sensor PCBA.

In some embodiments, the at least one piezoelectric actuator 130 and all the required electronics components of the touch-interface arrangement 100 can be integrated into the capacitive sensor PCBA 103.

A thickness of the at least one seal element 120 may be in the range 0.1-10 mm, 0.1-5 mm, 0.1-3 mm, 0.1-2 mm, 0.5-3 mm, 0.5-2 mm, or 0.2-1 mm. The thickness may be measured before the at least one seal element 120 is installed into the touch-interface arrangement 100. When the at least one seal element 120 is installed into the touch-interface arrangement 100, the thickness may be smaller due to the forces exerted onto the at least one seal element 120. Alternatively, when the at least one seal element 120 is installed into the touch-interface arrangement 100, the thickness may be larger. For example, when the capacitive sensor PCBA 103 is attached with the at least one seal element 120, there may be some pre-pressure on the at least one piezoelectric actuator 130 which can pull to capacitive sensor PCBA 103 outwards and push out the at least some seal element 120 if it is attached with an adhesive on both sides.

The thickness of the at least one seal element 120 may be measured in a direction from the support surface 106 to the overlay layer 101.

According to an embodiment, the capacitive sensor PCBA 103 is positioned on a first side of the support plate 111, the piezoelectric ceramic 108 is positioned on a second side of the support plate 111, opposing the first side of the support plate 111, and the capacitive sensor PCBA 103 comprises at least one recess 112 for the at least one piezoelectric actuator 130 for enabling haptic movement of the at least one piezo actuator 130.

According to an embodiment, a depth of the at least one recess 112 is 0.03-1 mm.

Alternatively or additionally, the depth of the at least one recess 112 may be 0.03-0.8 mm, 0.1-1 mm, 0.03-0.6 mm, 0.1-0.6 mm, 0.2-0.6 mm, or 0.2-0.4 mm.

The depth of the at least one recess 112 may be measured in a direction from the support surface 106 to the overlay layer 101.

The depth of the at least one recess 112 may be configured according to the allowable bending of the at least one piezoelectric actuator 130. The depth of the at least one recess 112 may be configured to such that overbending of the at least one piezoelectric actuator 130 can be prevented. Such overbending may damage the piezoelectric ceramic 108.

In the embodiment of FIG. 1, the first side of the support plate 111 corresponds to the top side of the support plate 111 and the second side of the support plate 111 corresponds to the bottom side of the support plate 111.

Each recess in the at least one recess 112 may be aligned with a corresponding piezoelectric actuator 130 in the at least one piezoelectric actuator 130.

Herein, when two components are aligned, this may indicate that the components are aligned with each other in the plane the relevant layer. The components may also be referred to as overlapping or as at least partially overlapping.

According to an embodiment, a thickness of the capacitive sensor PCBA is greater than the depth of the at least one recess 112.

One of or both of the capacitive sensor PCBA 103 and the at least one piezoelectric actuator 130 may be used to detect touch. Furthermore, the at least one piezoelectric actuator 130 may be used to detect magnitude of the force applied to the overlay layer 101. Thus, a user may use both the location of touch and the magnitude of the applied force to control the touch-interface arrangement 100 and/or an apparatus the touch-interface arrangement 100 is embodied in, such as a laptop computer.

According to an embodiment, the capacitive sensor PCBA further comprises circuitry for controlling the at least one piezoelectric actuator 130.

The circuitry for controlling the at least one piezoelectric actuator 130 may also be referred to as an electrical circuitry, an electronic circuitry, or similar.

The circuitry for controlling the at least one piezoelectric actuator 130 may comprise, for example, an analogue front end (AFE), a system on chip (SoC), a field-programmable gate array (FPGA), a controller chip, an application specific integrated circuit (ASIC), such as a booster chip, and/or other surface mount technology (SMT) components.

According to an embodiment, the touch-interface arrangement 100 further comprises at least one flexible printed circuit (FPC) 105 wherein the at least one piezoelectric actuator 130 is electrically coupled to the at least one FPC 105.

In some embodiments, the at least one FPC 105 may comprise a plurality of FPCs. The at least one piezoelectric actuator 130 can be electrically coupled to one or several separate FPCs.

According to an embodiment the at least one FPC 105 is mounted to the capacitive sensor PCBA 103 using two-sided adhesive tape, such as pressure-sensitive adhesives.

The at least one FPC 105 may be mounted to the capacitive sensor PCBA 103 using, for example, an adhesive 104, such as a two-sided adhesive tape, as is illustrated in the embodiment of FIG. 1. Other ways of mounting are also possible.

The at least one FPC 105 may be electrically coupled to the support plate 111 and/or to the piezoelectric ceramic 108 of the at least one piezoelectric actuator 130. The electrical coupling may comprise, for example, hot bar soldering, anisotropic conductive film (ACF), soldering, electrically conductive adhesives, conductive glue, such as silver glue, and/or similar.

For example, in the embodiment of FIG. 1, the at least one FPC 105 is electrically coupled to the support plate 111 via conductive glue 109, such as silver glue, and the at least one FPC 105 is electrically coupled to the piezoelectric ceramic 108 via conductive glue 107, such as silver glue.

The at least one FPC 105 can be electrical coupled to the capacitive sensor PCBA 103 using, for example, hot bar soldering, anisotropic conductive film (ACF), soldering, an electrically conductive adhesives, a conductive glue, or similar.

The circuitry for controlling the at least one piezoelectric actuator 130 in the capacitive sensor PCBA 103 may be electrically coupled to the at least one piezoelectric actuator 130 via the at least one FPC 105. The at least one FPC 105 may comprise, for example, conductive traces for electrically coupling the capacitive sensor PCBA 103 to the support plate 111 and/or to the piezoelectric ceramic 108 of the at least one piezoelectric actuator 130.

The at least one FPC 105 can be mounted to the support surface 106 via at least one adhesive 110. The at least one adhesive may also be referred to as a top adhesive, an adhesive dot, a top adhesive dot, or similar. There may be an adhesive dot for each piezoelectric actuator 130. The at least one adhesive 110 can be on the opposite side of at least one FPC than the at least one piezoelectric actuator 120.

According to an embodiment, the overlay layer 101 is mounted to the support surface 106 via the at least one seal element 120.

When the overlay layer 101 is mounted to the support surface 106 via the at least one seal element 120, the overlay layer 101 may be mounted to the support surface 106 via a chain of components comprising the at least one seal element 120 and any number of other components/structures.

For example, in the embodiment of FIG. 1, the overlay layer 101 is mounted to the support surface 106 via the adhesive layer 102, the capacitive sensor PCBA 103, and the at least one seal element 120.

In some embodiments, such as in the embodiment of FIG. 1, the overlay layer 101 may be also mounted to the support surface 106 via other chains of components, such as the at least one piezoelectric actuator 130, the at least one FPC 105, and the at least one adhesive 110.

In some embodiments, the overlay layer 101 and/or the capacitive sensor PCBA 103 can be mounted to support surface 106 also via other structures, such as using a two-sided adhesive tape, such as pressure-sensitive adhesives.

According to an embodiment, the overlay layer 101 is mounted to the support surface 106 only via the at least one seal element 120 and the at least one piezoelectric actuator 130.

When the overlay layer 101 is mounted to the support surface 106 only via the at least one seal element 120 and the at least one piezoelectric actuator 130, the overlay layer 101 may be mounted to the support surface 106 only via chains of components comprising the at least one seal element 120 and any number of other components/structures and/or the at least one piezoelectric actuator 130 and any number of other components/structures. For example, in the embodiment of FIG. 1, the overlay layer 101 is mounted to the support surface 106 via a chain of components comprising the adhesive layer 102, the capacitive sensor PCBA 103, and the at least one seal element 120 and a chain of components comprising the adhesive layer 102, the capacitive sensor PCBA 103, the at least one piezoelectric actuator 130, the at least one FPC 105, and the at least one adhesive 110.

When the overlay layer 101 is mounted to the support surface 106 only via the at least one seal element 120 and the at least one piezoelectric actuator 130, the overlay layer 101 may be considered to be mounted to the support surface 106 in a floating fashion. This can improve haptic properties of the touch-interface arrangement 100.

The touch-interface arrangement 100 can protect the at least one piezoelectric actuator 130 and/or other electronics and electromechanical components against contamination, such as liquids, dust, and/or other particles that may hinder operation of, for example, the at least one piezoelectric actuator 130.

The at least one seal element can prevent contamination from entering the touch-interface arrangement 100 and interacting with the electrical and/or mechanical components inside the touch-interface arrangement 100. This can prevent abnormal operation and/or failure of the touch-interface arrangement 100.

The at least one seal element 120 can enable sufficient movement between the overlay layer 101 and the support surface 106 to enable haptic effects to be provided. Further, the at least one seal element 120 can be more robust than, for example, an adhesive.

According to an embodiment, a compression load deflection of the at least one seal element 120 is 0.5-50 kilopascal (kPa) when measured according to JIS K 6254.

Alternatively, a compression load deflection of the at least one seal element 120 may be 0.5-30, 1-30 kPa, 0.5-20, 1-20 kPa, 2-30 kPa, 2-20 kPa, 2-15 kPa, 5-30 kPa, 5-20 kPa, or 5-15 kPa when measured according to, for example, JIS K 6254

According to an embodiment, a compression set of the at least one seal element 120 is 0.5-5 percent when measured according to JIS K 6401.

Alternatively, a compression set of the at least one seal element 120 may be 1-5%, 0.5-4%, 0.5-3%, 1-4%, 1-3%, 1.5-5%, 1.5-4%, 1.5-3%, or 1.5-2.5% when measured according to, for example, JIS K 6401.

Additionally or alternatively, a compression force deflection of the at least one seal element 120 may be 0.5-20 kPa, 1-20 kPa, 1-10 kPa, 1-7 kPa, 1-5 kPa, or 1.5-5 kPa when measured with a 0.51 cm/min strain rate and force measured at 25% deflection.

According to an embodiment, a Shore A hardness of the at least one seal element 120 is 0.5-70, 0.5-50, 1-70, 1-50, 5-70, 5-50, 10-70, 10-50, 20-70, or 20-50.

At least some of the aforementioned material parameters can provide advantageous sealing properties.

The at least one seal element 120 may be made of a soft, spring-like material that returns into its original shape after compression.

According to an embodiment, the at least one seal element 120 comprises polyurethane, microcellular urethane, microcellular urethane foam, open cell urethane foam, closed cell urethane foam, silicone rubber, liquid silicone rubber, synthetic fibre fabric, and/or natural fibre fabric.

Alternatively, the at least one seal element 120 may comprise any other appropriate material.

In some embodiments, the at least one seal element 120 further comprises a carrier material. The carrier material may comprise, for example, polyethylene terephthalate, polyimide, and/or similar. This may be needed if, for example, the at least one seal element 120 is made of a very soft material.

The at least one seal element 120 may be made of, for example, polyurethane, microcellular urethane, microcellular urethane foam, open cell urethane foam, closed cell urethane foam, silicone rubber, liquid silicone rubber, synthetic fibre fabric, and/or natural fibre fabric.

At least some embodiments disclosed here can, for example, enable an active area of the overlay layer 101 with haptic functionality to extend to close to an outer edge of the overlay layer 101. This can lead to a small non-active area.

Structure of the touch-interface arrangement 100 near the edge areas can be important for reaching a small non-active area. For example, there may not be much space in the thickness direction near the front edge of a laptop computer. At least some embodiments disclosed here can, for example, lead to comparatively thin constructions of the touch-interface arrangement 100.

At least in some embodiments disclosed herein, the non-active area can be only as wide as the width of grounding copper wiring that can be placed around the outer edge of the capacitive sensor PCBA 103. The grounding copper width may be, for example, 0.4-1.0 mm or even smaller.

At least some embodiments disclosed herein can, for example, lower costs of manufacturing the touch-interface arrangement 100 due to the possibility of integrating electronics into the capacitive sensor PCBA 103.

At least some embodiments disclosed herein can, for example, enable modular structure for the touch-interface arrangement 100. For example, the touch-interface arrangement 100 can be assembled as a single module to a C-cover of a laptop computer. This can enable the touch-interface arrangement 100 to be manufactured separately and easily assembled on, for example, the final assembly line of the laptop.

In some embodiments, the whole overlay layer 101 can be a haptic active area. This may be the case for example, if the overlay layer 101 is mounted to the support surface 106 in a floating fashion. Alternatively, only a part of the overlay layer 101 may be a haptic active area. In both cases, the touch-interface arrangement 100 can be well shielded against impurities and liquids.

If the overlay layer 101 is mounted to the support surface 106 in a floating fashion, a long tolerance chain problem in the thickness direction can be solved because the at least one seal element 120 can allow the overlay layer 101 to move in the thickness direction of the touch-interface arrangement 100.

Figure 2:
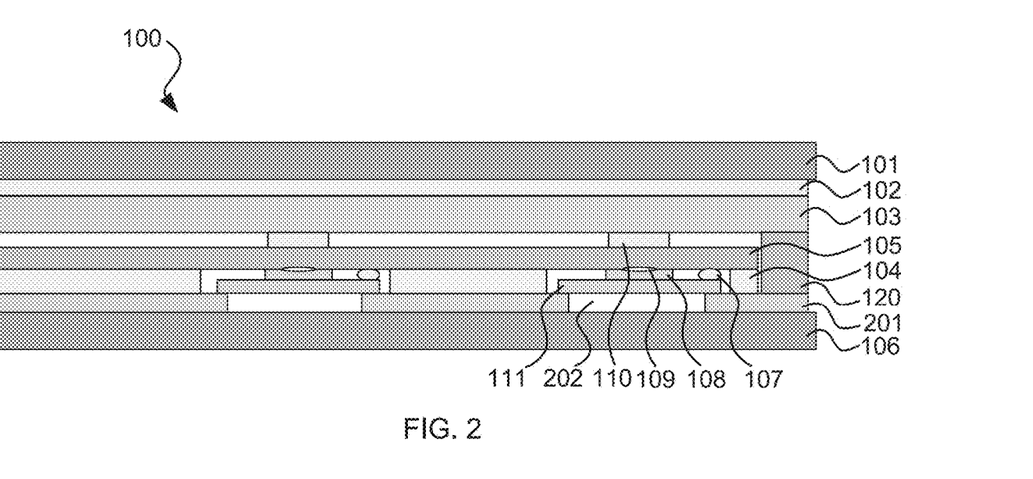
FIG. 2 illustrates cross-sectional representation of a touch-interface arrangement according to an embodiment.

FIG. 2 illustrates cross-sectional representation of a touch-interface arrangement 100 according to an embodiment.

In the embodiment of FIG. 2, the touch-interface arrangement 100 further comprises an isolation adhesive layer 201.

According to an embodiment, the capacitive sensor PCBA 103 is positioned on a first side of the support plate 111, the piezoelectric ceramic 108 is positioned on the first side of the support plate 111, the isolation adhesive layer 201 is positioned on a second side of the support plate 111, opposing the first side of the support plate 111, and the isolation adhesive layer 201 comprises at least one recess 202 for the at least one piezoelectric actuator 130 for enabling haptic movement of the at least one piezo actuator 130.

Effectively, the at least one piezoelectric actuator 130 in the embodiment of FIG. 2 is upside down compared to the embodiment of FIG. 1.

Any disclosure herein in relation to the embodiment of FIG. 1 may also apply to the embodiment of FIG. 2.

Any disclosure herein in relation to the at least one recess 112 in the capacitive sensor PCBA 103 may also apply to the at least one recess 202 in the isolation adhesive layer 201.

Figure 3:
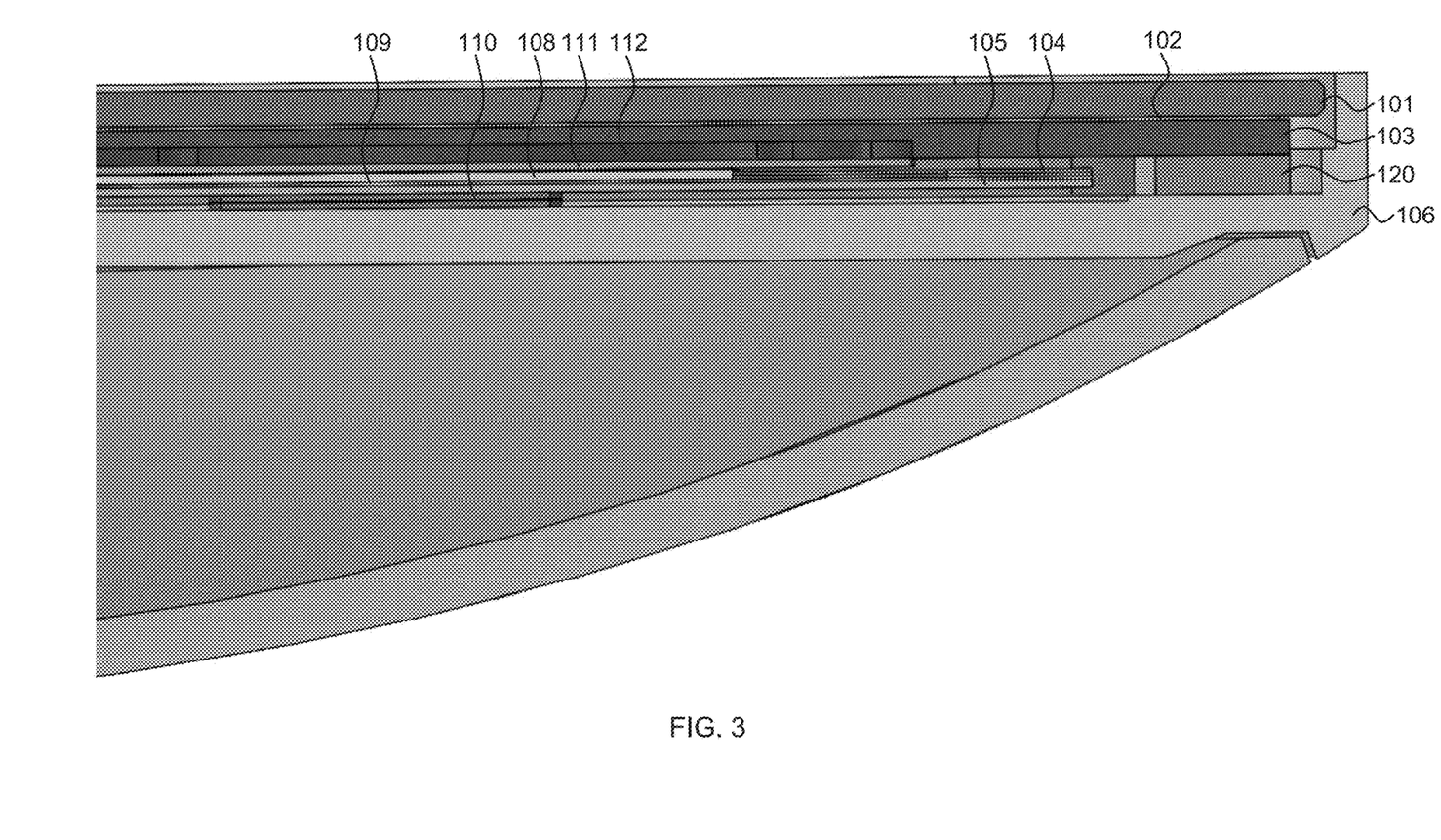
FIG. 3 illustrates cross-sectional representation of a touch-interface arrangement according to an embodiment.

FIG. 3 illustrates cross-sectional representation of a touch-interface arrangement according to an embodiment.

According to an embodiment, the support surface 106 comprises a C-cover of a laptop computer and the at least one seal element 120 is positioned between the capacitive sensor PCBA 103 and the C-cover.

A C-cover may refer to a surface/face/structure of the laptop computer which holds a trackpad and a keyboard.

The embodiment of FIG. 3 illustrates an example of the touch-interface arrangement 100 being integrated into a laptop computer.

According to an embodiment, the at least one seal element is mounted to the C-cover and/or to the capacitive sensor PCBA 103 with an adhesive.

In the embodiment of FIG. 3, the adhesive 104 mounting the at least one FPC 105 to the capacitive sensor PCBA 103 and the least one adhesive 110 between the at least one FPC 105 and the support surface 106 comprise polyethylene terephthalate (PET) adhesive tape with an adhesive on both sides.

Figure 4:
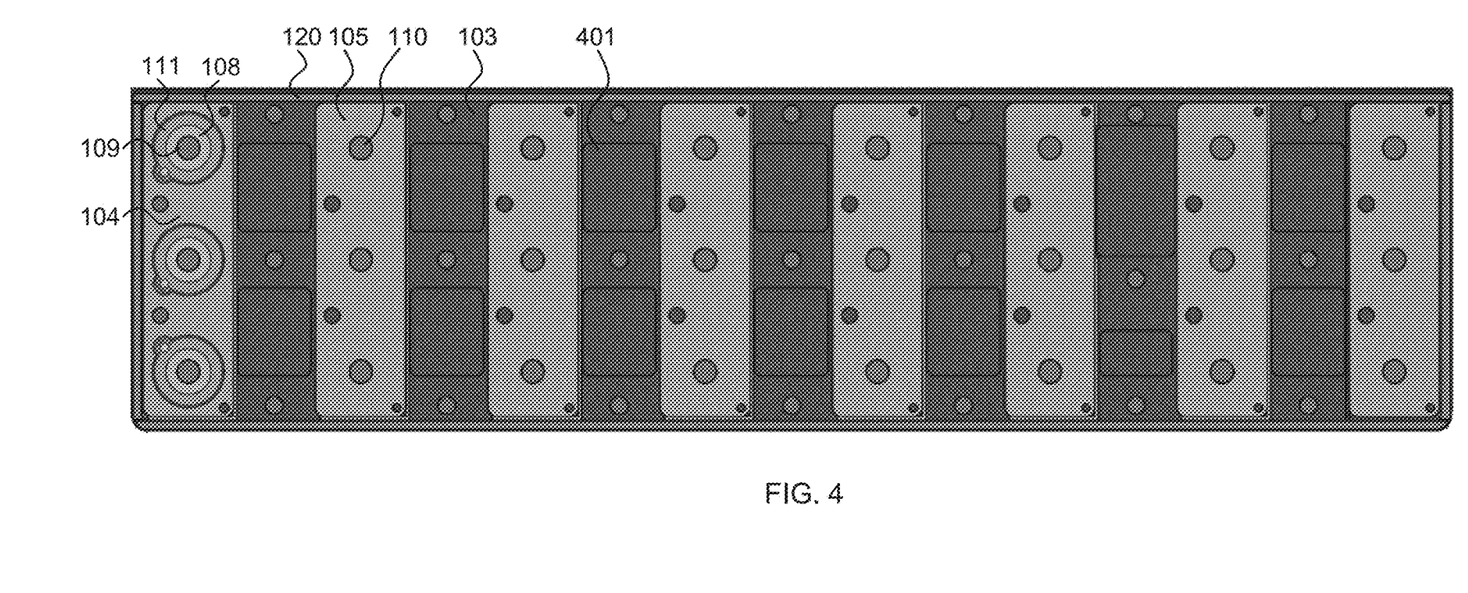
FIG. 4 illustrates planar view of a touch-interface arrangement according to an embodiment.

FIG. 4 illustrates planar view of a touch-interface arrangement according to an embodiment.

In the embodiment of FIG. 4, the construction of the touch-interface arrangement 100 is similar to that of the embodiment of FIG. 1. The piezoelectric actuators are arranged into groups of three, wherein each group is electrically coupled to one FPC 105, and the touch-interface arrangement 100 comprises eight such groups. The FPC is not illustrated in FIG. 4 for the left-most group of piezoelectric actuators for illustrative purposes.

In the embodiment of FIG. 4, the capacitive sensor PCBA 103 comprises spaces 401 for components on the second side of capacitive sensor PCBA 103. The capacitive sensor PCBA 103 may further comprise capacitive sensors for detecting touch on the overlay layer 101. For example, the capacitive sensor PCBA 103 can comprise a capacitive sensor grid on the first side of the capacitive sensor PCBA 103. The capacitive sensor grid can, for example, cover the whole area of the capacitive sensor PCBA 103.

In the embodiment of FIG. 4, the at least one seal element 120 comprises a plurality of seal elements encircling the plurality of piezoelectric actuators 130. The plurality of seal elements 120 comprises four separate seal elements, each positioned to a corresponding edge of the capacitive sensor PCBA 103. Thus, the at least one seal element 105 is positioned on a first, second, third, and fourth side of the at least one piezoelectric actuator 130.

The first, second, third, and fourth side may refer to different sides of the at least one piezoelectric actuator 130 within a plane of the at least one piezoelectric actuator 130. Thus, a direction from the first side to the second side may be substantially perpendicular to a direction from the support surface 106 to the overlay layer 101 and substantially perpendicular to a direction from the third direction to the fourth direction.

Figure 5:
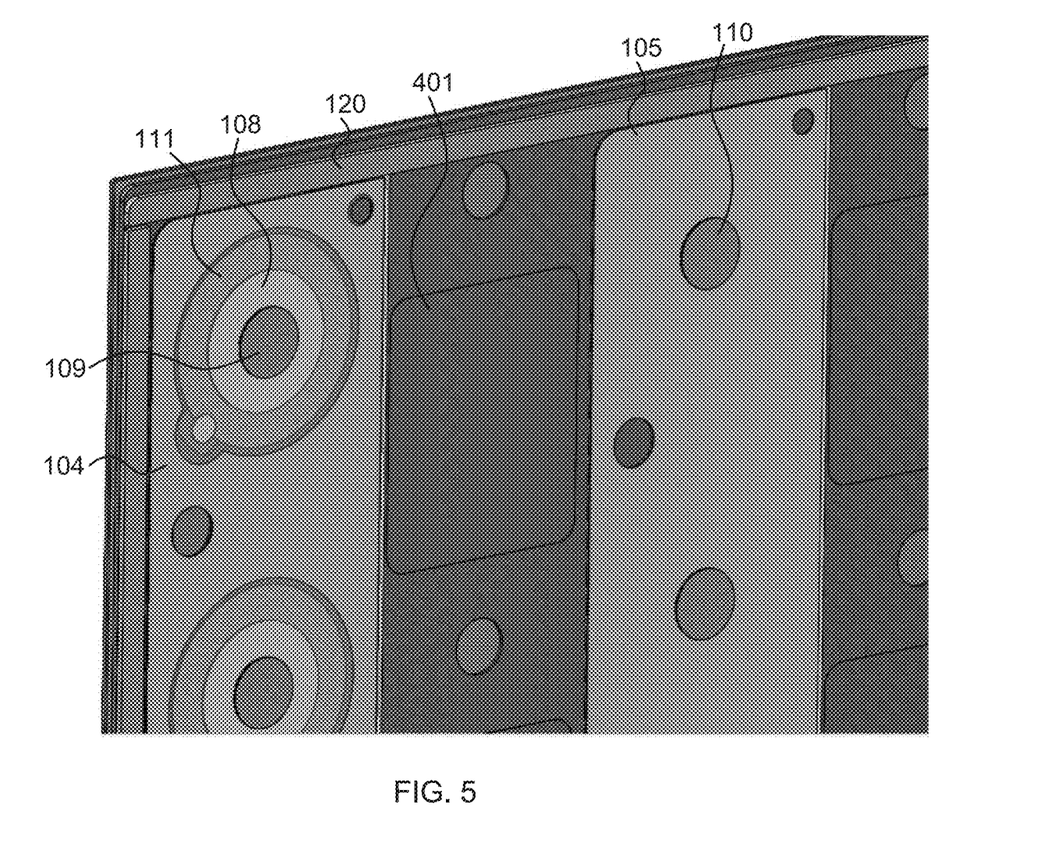
FIG. 5 illustrates perspective view of a touch-interface arrangement according to an embodiment.

FIG. 5 illustrates perspective view of a touch-interface arrangement according to an embodiment.

In the embodiment of FIG. 5, the construction of the touch-interface arrangement 100 is similar to that of the embodiments of FIGS. 1 and 4.

Figure 6:
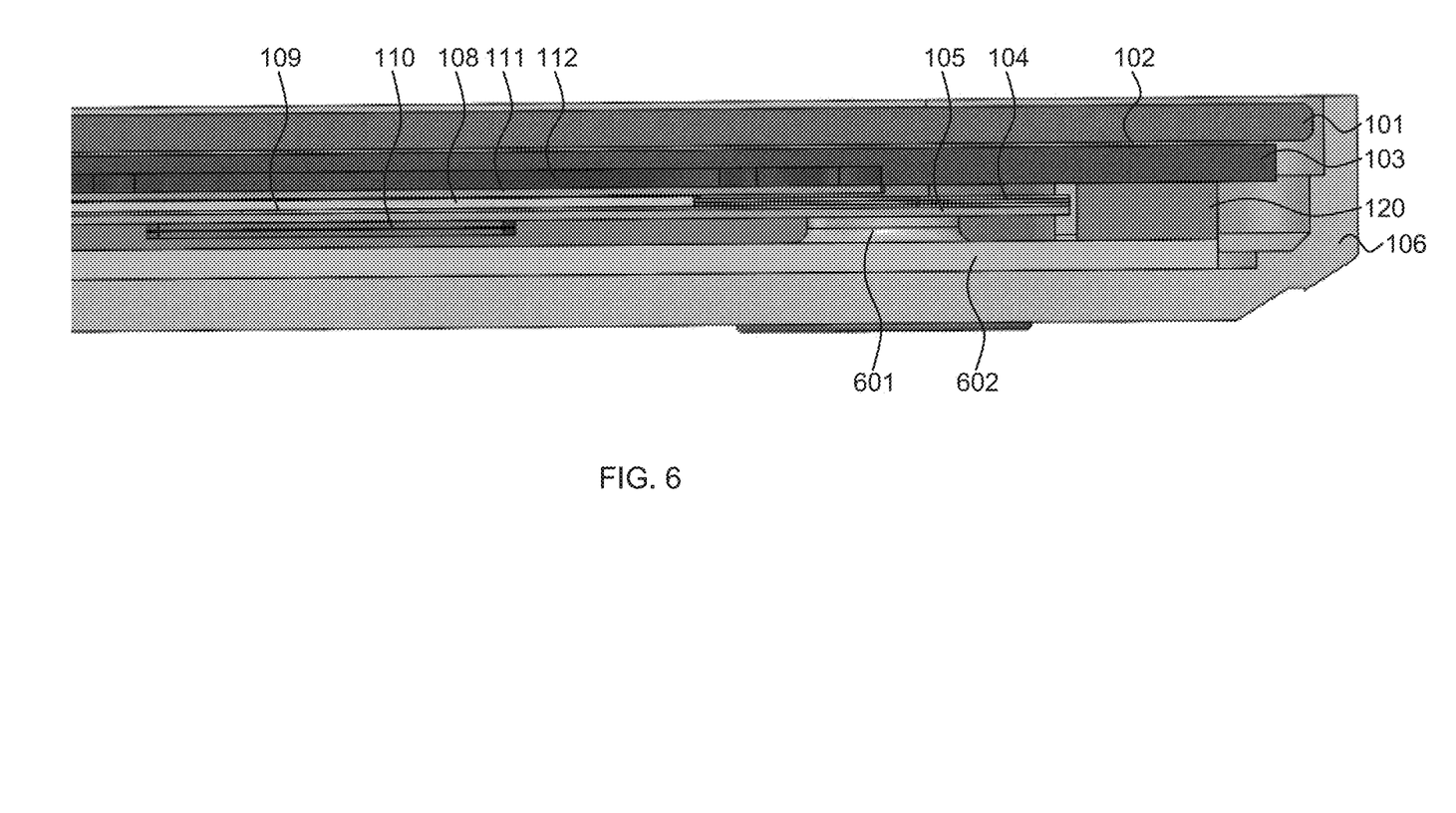
FIG. 6 illustrates cross-sectional representation of a touch-interface arrangement according to an embodiment.

FIG. 6 illustrates cross-sectional representation of a touch-interface arrangement according to an embodiment.

The embodiment of FIG. 6 illustrates another example of the touch-interface arrangement 100 being integrated into a laptop computer.

In the embodiment of FIG. 6, the arrangement 100 further comprises a support structure 602 such as a metal bracket. The support structure 602 can be attached with, for example, screws to the C-cover of a laptop computer. The support structure 602 can comprise protrusions 601 comprising, for example, thread inserts, self-clinching nuts, laser welded inserts, or screw inserts for screw threads. Such an arrangement 100 may be easier to disassemble than one attached with an adhesive. On the other hand, the support structure 602 may increases the thickness of the arrangement 100.

Figure 7:
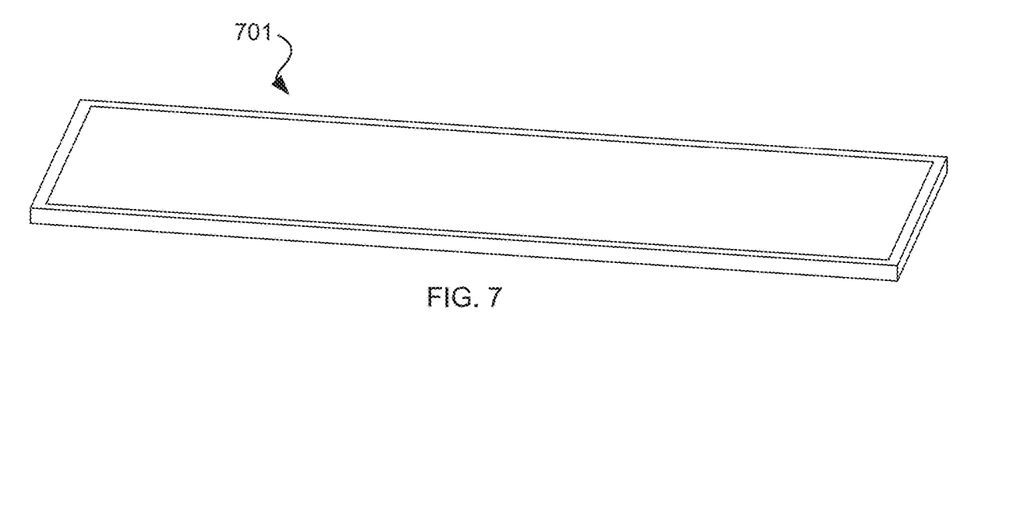
FIG. 7 illustrates a schematic representation of a touch interface surface of a laptop computer according to an embodiment.

FIG. 7 illustrates a schematic representation of a touch interface surface of a laptop computer according to an embodiment.

According to an embodiment, the overlay layer 101 comprises a touch interface surface 701 of a laptop computer.

The touch-interface surface 701 may be at least partially unobstructed. A user may touch the unobstructed part of the touch-interface surface 701 and the touch-interface arrangement 100 may detect the touches and/or provide haptic effect/feedback for the user via the touch-interface surface 701.

In a typical usage scenario of the touch-interface arrangement 100, the overlay layer 101 and the touch-interface surface 701 may be facing up. This may be the case, for example, when the touch-interface arrangement 100 is embodiment in a trackpad of a laptop computer.

The touch-interface surface 701 may also be referred to as a touch interface, a touch surface, a touch pad, a track pad, or similar.

Figure 8:
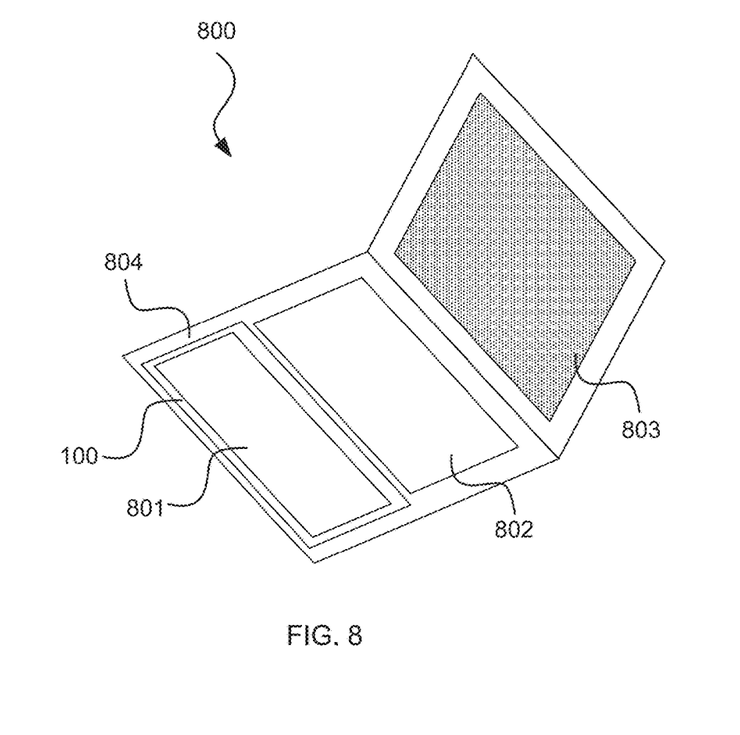
FIG. 8 illustrates a schematic representation of a laptop computer according to an embodiment.

FIG. 8 illustrates a schematic representation of a laptop computer according to an embodiment.

The laptop computer 800 may comprise a trackpad 801. The laptop computer 800 may further comprise a keyboard 802, a screen 803, and a chassis 804. The laptop computer 800 may further comprise various other components not depicted in the embodiment of FIG. 8.

According to an embodiment a laptop computer 800 comprises the touch-interface arrangement 100.

For example, the touch-interface arrangement 100 may be used to implement the trackpad 801 of the laptop computer 800. The trackpad 801 may also be referred to as a touchpad or similar. A user may operate the laptop computer 800 using the trackpad 801. The touch-interface arrangement 100 can provide haptic effects to the user. The touch-interface arrangement 100 may be controlled by the laptop computer 800. For example, when a user clicks on an icon on the computer 800 using the trackpad 801, the touch-interface arrangement 100 can provide a haptic effect to the user in response. The haptic effect can be controlled by, for example, the operating system of the laptop computer 800.

The touch-interface arrangement 100 may comprise, for example, a controller. The controller may control, for example, the at least one piezoelectric actuator 130 of the touch-interface arrangement 100. The touch-interface arrangement 100 may further comprise an analogue front end (AFE) and/or a booster circuitry/ASIC. The booster circuitry/ASIC can be configured to provide a high voltage for driving the at least one piezoelectric actuator 130. The booster circuit/ASIC may also be referred to as a voltage booster circuit/ASIC or similar.

The laptop computer 800 may comprise a processor. The laptop computer 800 may further comprise a memory. The processor may control, for example, the at least one piezoelectric actuator 130 of the touch-interface arrangement 100 via, for example, the controller and/or the AFE.

The memory may comprise program code, such as drivers, which cause the laptop computer 800 to interface with the touch-interface arrangement 100 when the program code is executed on the processor. Interfacing with the touch-interface arrangement 100 may comprise, for example, transmitting signals that cause the at least one piezoelectric actuator 130 in the touch-interface arrangement 100 to provide a haptic effect to the user and/or receiving signals from the touch-interface arrangement 100 that correspond to a user touching the touch-interface surface of the touch-interface arrangement 100.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A touch-interface arrangement, comprising:
   an overlay layer;
   a capacitive sensor printed circuit board assembly (PCBA) mounted to the overlay layer, wherein the overlay layer is positioned on a first side of the capacitive sensor PCBA;
   at least one piezoelectric actuator positioned on a second side of the capacitive sensor PCBA, opposing the first side of the capacitive sensor PCBA, wherein the at least one piezoelectric actuator comprises a support plate and a piezoelectric ceramic; and
   at least one seal element positioned on the second side of the capacitive sensor PCBA for at least partially sealing the at least one piezoelectric actuator between the capacitive sensor PCBA and a support surface.

2. The touch-interface arrangement according to claim 1, wherein the capacitive sensor PCBA is positioned on a first side of the support plate, the piezoelectric ceramic is positioned on a second side of the support plate, opposing the first side of the support plate, and the capacitive sensor PCBA comprises at least one recess for the at least one piezoelectric actuator for enabling haptic movement of the at least one piezo actuator.

3. The touch-interface arrangement according to claim 2, wherein a depth of the at least one recess is 0.03-1 millimeters.

4. The touch-interface arrangement according to claim 3, wherein a thickness of the capacitive sensor PCBA is greater than the depth of the at least one recess.

5. The touch-interface arrangement according to claim 1, wherein the capacitive sensor PCBA further comprises circuitry for controlling the at least one piezoelectric actuator.

6. The touch-interface arrangement according to claim 1, wherein the support surface comprises a C-cover of a laptop computer and the at least one seal element is positioned between the capacitive sensor PCBA and the C-cover.

7. The touch-interface arrangement according to claim 6, wherein the at least one seal element is mounted to the C-cover and/or to the capacitive sensor PCBA with an adhesive.

8. The touch-interface arrangement according to claim 1, further comprising at least one flexible printed circuit (FPC), wherein the at least one piezoelectric actuator is electrically coupled to the at least one FPC.

9. The touch-interface arrangement according to claim 8, wherein the at least one FPC is mounted to the capacitive sensor PCBA using two-sided adhesive tape.

10. The touch-interface arrangement according to claim 1, wherein the overlay layer is mounted to the support surface via the at least one seal element.

11. The touch-interface arrangement according to claim 10, wherein the overlay layer is mounted to the support surface only via the at least one seal element and the at least one piezoelectric actuator.

12. The touch-interface arrangement according to claim 1, wherein the at least one seal element comprises polyurethane, microcellular urethane, microcellular urethane foam open cell urethane foam, closed cell urethane foam, silicone rubber, liquid silicone rubber, synthetic fibre fabric, and/or natural fibre fabric.

13. The touch-interface arrangement according to claim 1, wherein a compression load deflection of the at least one seal element is 0.5-50 kilopascal when measured according to JIS K 6254.

14. The touch-interface arrangement according to claim 1, wherein the overlay layer comprises a touch interface surface of a laptop computer.

15. A laptop computer comprising the touch-interface arrangement according to claim 1.

\* \* \* \* \*